US008069599B2

(12) United States Patent
Kitchen et al.

(10) Patent No.: US 8,069,599 B2
(45) Date of Patent: Dec. 6, 2011

(54) DOUBLE BRIDGED TAG

(75) Inventors: Gerald Kitchen, Little Compton, RI (US); Jeffrey A. Roy, Thompson, CT (US); Wing Kwong Ng, Shatin (HK); Dustin Moore, Norton, MA (US)

(73) Assignee: FGX International, Inc., Smithfield, RI (US)

( * ) Notice: Subject to any disclaimer, the term of this patent is extended or adjusted under 35 U.S.C. 154(b) by 294 days.

(21) Appl. No.: 12/133,208

(22) Filed: Jun. 4, 2008

(65) Prior Publication Data

US 2009/0031603 A1    Feb. 5, 2009

Related U.S. Application Data

(60) Provisional application No. 60/941,970, filed on Jun. 5, 2007.

(51) Int. Cl.
*G06F 3/14* (2006.01)

(52) U.S. Cl. ........................................ 40/665; 24/16 PB

(58) Field of Classification Search .................. 40/664, 40/665; 248/902; 24/16 PB
See application file for complete search history.

(56) References Cited

U.S. PATENT DOCUMENTS

| | | | |
|---|---|---|---|
| 4,779,828 A * | 10/1988 | Munch | 248/74.3 |
| 4,976,532 A | 12/1990 | Nyman | |
| 5,129,617 A | 7/1992 | MacWilliamson | |
| 5,144,345 A * | 9/1992 | Nyman | 351/158 |
| 5,260,726 A | 11/1993 | Nyman | |
| 5,437,172 A | 8/1995 | Lamy et al. | |
| 5,559,567 A | 9/1996 | Kolton et al. | |
| 5,568,951 A | 10/1996 | Morgan | |
| 5,650,836 A | 7/1997 | Strauss et al. | |
| 5,699,990 A | 12/1997 | Seach | |
| 5,791,079 A | 8/1998 | Mazzucchelli | |
| 5,864,924 A | 2/1999 | Rodriguez | |
| 5,969,613 A | 10/1999 | Yeager et al. | |
| 6,273,375 B1 | 8/2001 | Knepp et al. | |
| 6,624,753 B2 | 9/2003 | Elston | |
| 6,701,579 B1 | 3/2004 | De La Pena Razquin | |
| 6,845,581 B2 | 1/2005 | Doerr et al. | |
| 2003/0088948 A1* | 5/2003 | Cook | 24/16 PB |
| 2007/0266531 A1* | 11/2007 | Krisel | 24/16 PB |

FOREIGN PATENT DOCUMENTS

GB         2 237 676 A         5/1991

OTHER PUBLICATIONS

PCT International Search Report in PCT/US2008/007014 dated Aug. 7, 2008.
PCT International Preliminary Report on Patentability for PCT/US2008/007014 dated Dec. 17, 2009.

* cited by examiner

*Primary Examiner* — Joanne Silbermann
(74) *Attorney, Agent, or Firm* — Edwards Wildman Palmer LLP; George N. Chaclas

(57) ABSTRACT

A tag comprising: a hang tab body; a hang tab; a ratchet; a cutting channel; a guide channel; and, a tail, the tail comprising teeth and at least one knob. The tail may be fed through the guide channel and the cutting channel into the ratchet, thereby allowing the ratchet to engage the teeth, which in turn prevents the tail from being disengaged from the ratchet, thereby securing the tag to a product. The product may be easily released by severing the portion of the tag in the cutting channel. The cutting channel can also provide a guide which helps to prevent damaging the product as the tag is remove.

16 Claims, 4 Drawing Sheets

DOUBLE BRIDGED TAG

This application claims the benefit under 35 U.S.C. 119(e) of the filing date of provisional application Ser. No. 60/941,970, filed Jun. 5, 2007.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The instant disclosure relates to the field of display tags, and in particular to display tags for eyewear.

BACKGROUND

Prior to purchasing sun glasses, reading glasses, or other eyewear, a customer will typically browse a store's selection, trying on different pairs. A variety of eyewear displays are available, with different displays being advantageous for different eyewear styles. For example, some eyewear displays include a tray which supports the frame under the lenses and/or via the nose bridge, and such displays also include a portion for receiving the eyewear arms. Thus, the eyewear is presented in an open manner, and the purchaser can readily observe the eyewear from many angles. While such displays are advantageous in certain settings or with certain eyewear styles, these displays tend to require significant floor space and do not permit a large number of eyewear to be presented to the user in a compact space. To facilitate the presentation of a larger number of eyewear, some displays utilize hang tags from which the eyewear hang. The hang tags allow the eyewear to be displayed with the arms closed, thereby allowing, more eyewear to be displayed in the same retail space as the open-arm displays described above.

SUMMARY OF THE INVENTION

What is needed is a hang tag that facilitates easy removal by a purchaser without damaging the eyewear or other product being displayed, while providing a means through which the product can be attractively displayed to the purchaser prior to the purchase, and which allows the purchaser to try on the product without unnecessary obstructions. Accordingly, the instant disclosure is directed to a hang tag that substantially obviates one or more of the problems due to limitations and disadvantages of the related art.

Additional features and advantages of the double bridged tag will be set forth in the description which follows, and in part will be apparent from this disclosure, or may be learned by practice of the invention. The objectives and other advantages of the invention will be realized and attained by the structure particularly pointed out in this written description, including any claims contained herein and the appended drawings.

At least one embodiment comprises a double bridged tag which can present eyewear in a substantially horizontal orientation, similar to the orientation the eye wear maintains when worn by a purchaser. Such an orientation allows the purchaser to more easily appreciate the style of the eyewear and envision how the eyewear will look on the purchaser. In at least one such embodiment, at least a portion of the tag may comprise flexible knobs that grip the product being displayed and allow it to maintain a relatively constant orientation regardless of the shape of the product being displayed.

At least one embodiment comprises a double bridged tag which can present the eyewear in a substantially vertical orientation by wrapping around or otherwise engaging an arm of the eyewear.

At least one embodiment can be used with a variety of product designs having varying thicknesses, thereby reducing the manufacturing and tooling costs associated with having multiple, product-specific tags. By way of example, without limitation, at least one embodiment can be used with a variety of eyewear designs having a variety of bridge thicknesses, thereby obviating the need for individual tags for each different bridge thicknesses. At least some embodiments may also be easy to assemble, thereby allowing significant reductions in production time and tooling costs.

In at least one embodiment, the invention provides a double bridged tag comprising: a hang tab body; a hang tab; a guide channel; a ratchet channel, wherein the ratchet channel comprises a ratchet; a cutting channel; and, a tail, wherein the tail comprises teeth and at least one knob. The tail may be fed through the guide channel and over and/or through the cutting channel into the ratchet channel, thereby permitting the ratchet contained therein to engage the teeth. Such engagement can prevent the tail from being disengaged from the ratchet while also permitting the tag to accommodate a variety of product thicknesses. Some embodiments may further comprise a sensor slot, wherein the sensor slot facilitates the placement of an RFID tag or other such security measure proximate to the hang tab.

It is to be understood that both the foregoing general description and the following detailed description are exemplary and explanatory and are intended to provide further explanation of the disclosed double bridged tag.

BRIEF DESCRIPTION OF THE DRAWINGS

The accompanying drawings, which are included to provide a further understanding of the disclosed double bridged tag and are incorporated in and constitute a part of this specification, illustrate various embodiments and, together with the description, serve to explain the principles of at least one embodiment of the disclosed double bridged tag.

In the drawings.

DETAILED DESCRIPTION OF THE INVENTION

Figures 1, 2:
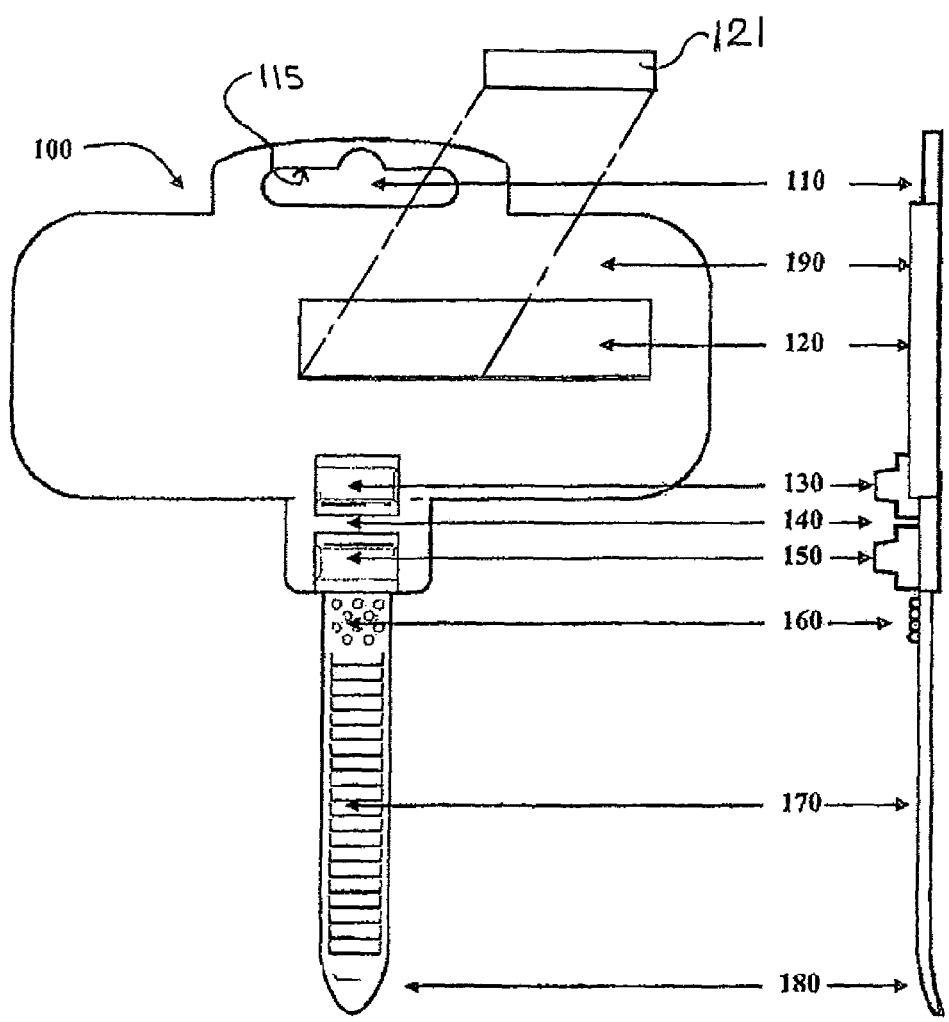
FIG. 1 is a rear plan view illustrating a double bridged tag according to an embodiment of the invention.
FIG. 2 is a right-hand elevation view illustrating a double bridged tag according to an embodiment of the invention.

Reference will now be made in detail to embodiments of the disclosed double bridged tag, examples of which are illustrated in the accompanying drawings.

While this invention is susceptible of embodiment in many different forms, there is shown in the drawings, and described in detail herein, one embodiment, with the understanding that the present disclosure is to be considered an exemplification of the principles of the invention and is not intended to limit the invention to the embodiment illustrated.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments. Any numerical values or indicia provided in the illustrations are provided by way of example, and the invention is not to be construed as being limited thereto.

FIG. 1 is a rear plan view illustrating a double bridged tag 100 according to an embodiment of the invention, and FIG. 2 is a right-hand elevation view thereof. In the embodiment illustrated in FIGS. 1 and 2, the double bridged tag 100 comprises, a hang tag body 190 and at least one hang tab 110 to allow double bridged tag 100 to be used with the wide variety of hang tag displays that are commercially available. Although hang tab 110 as shown in FIG. 1 incorporates a slot hole 115, other shapes may be used, e.g., a round hole or a 3-hook, without departing from the spirit or scope of the invention.

In various embodiments, double bridged tag 100 may further comprise a sensor slot 120 to accommodate a security article 121 (shown exploded from the tag 100 in FIG. 1) such as an electronic article surveillance sensor, RFID tag, or other security measure which can, for example, assist in reducing shoplifting.

As FIGS. 1 and 2 further illustrate, double bridged tag 100 may comprise a tail 180, tail 180 having at least one flexible region comprising at least one knob 160, and teeth 170. In some embodiments, the entirety of tail 180 is made from the same material as hang tag body 190. Exemplary materials for hang tag body 190 include, without limitation, polyethylene polyester, or the like. In some embodiments, the portion of tail 180 comprising the at least one knob 160 may further comprise a softer, more flexible material such as, without limitation, silicone. Such material may be a coating over the underlying material of tail 180, or the region comprising the at least one knob 160 may be made of the material. In some embodiments, tail 180 may be made of a material dissimilar to that of tag body 190.

In an embodiment, to engage eyewear comprising thin eyewear bridges within the double bridged tag 100, the bridge of the eyewear can be placed in contact with the portion of tail 180 comprising the at least one knob 160. Tail 180 is then fed through guide channel 150 and across and/or through cutting channel 140 into ratchet channel 130. As a result, a ratchet within ratchet channel 130 can engage teeth 170, thereby limiting the movement of tail 180 to a direction which further engages tail 180. In an embodiment, tail 180 can be fed into ratchet channel 130 until tail 180 has firmly engaged the eyewear. Once the eyewear is firmly engaged, the one way motion of ratchet channel 130 prevents the eyewear from being unintentionally disengaged from the double bridged tag 100, thereby reducing shoplifting.

Figure 3:
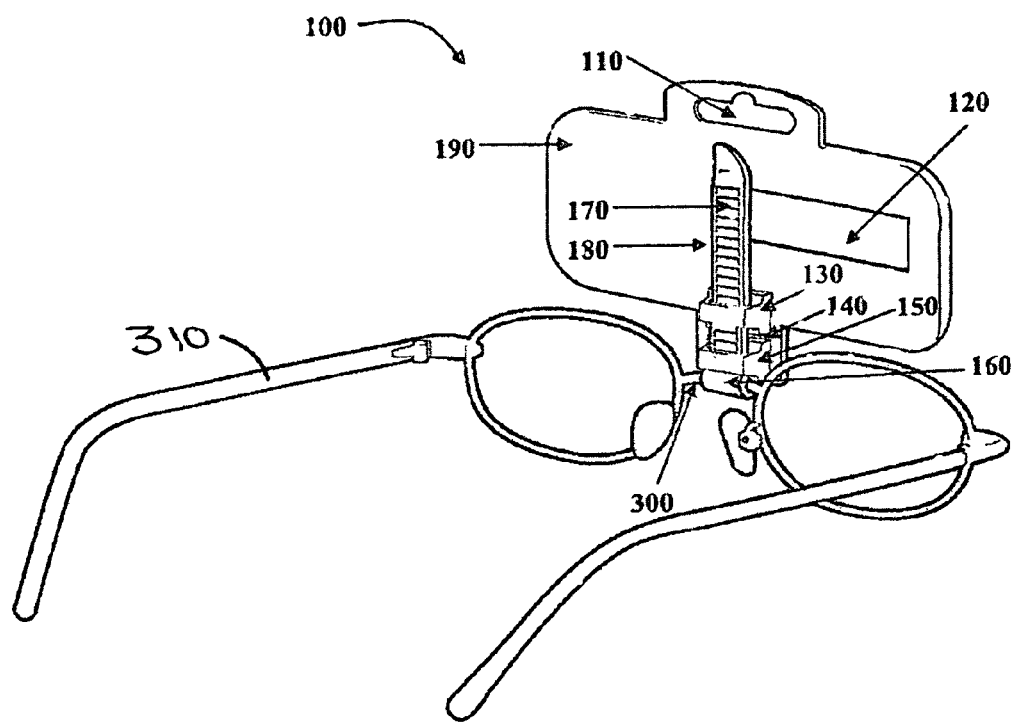
FIG. 3 is a top perspective view illustrating a double bridged tag engaged to eyewear, according to an embodiment of the invention.

FIG. 3 is a top perspective view illustrating a double bridged tag 100 in which the tail 180 has firmly engaged the eyewear. The double bridged tag 100 may now be displayed on a hang tag display. As FIG. 3 illustrates, the at least one knob 160 provides an enhanced gripping surface for eyewear comprising thin eyewear bridges when the double bridged tag 100 is engaged. As illustrated in the figures, teeth 170 may be recessed into the tag. However, as will be recognized by those of ordinary skill in the art, teeth 170 need not be recessed and may be provided by alternate means without departing from the spirit and scope of the invention.

Figure 4A:
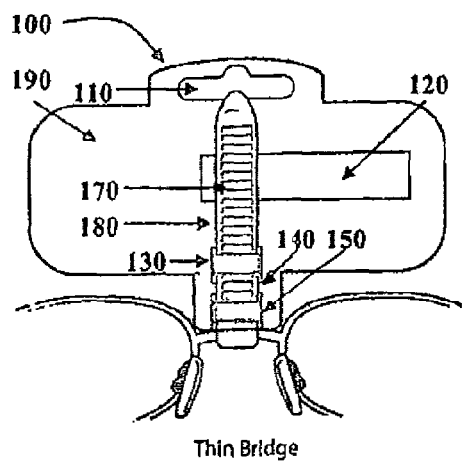
FIGS. 4a and 4b are rear plan views illustrating a double bridged tag, according to an embodiment of the invention engaging eyewear having a thin bridge and eyewear having a thick bridge, respectively.
Figure 4B:
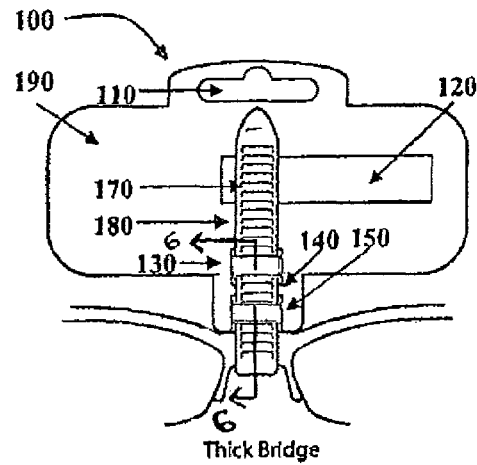

FIG. 4a is a rear plan view illustrating a double bridged tag 100 in which tail 180 has firmly engaged eyewear having a thin bridge. FIG. 4b is a rear plan view illustrating a double bridged tag 100 in which tail 180 has firmly engaged eyewear having a thick bridge. As FIGS. 4a and 4b illustrate, tail 180, at least one knob 160, teeth 170, and ratchet 130 allow double bridged tag 100 to be used with eyewear having varying bridge thicknesses. Further, tail 180, at least one knob 160, teeth 170, and ratchet 130 allow the double bridged tag 100 to display a wide variety of products including, but not limited to belts and watches.

Figure 5A:
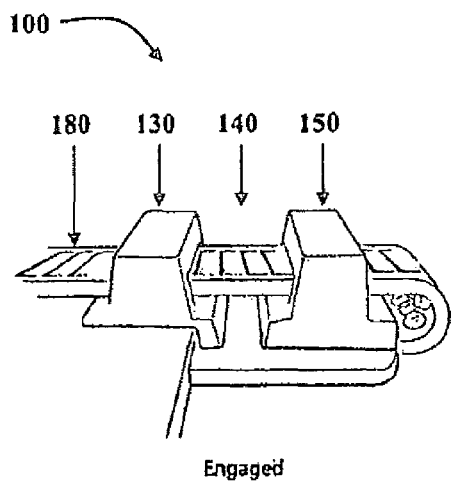
FIG. 5a is a left-hand perspective view illustrating a double bridged tag with the tail in an engaged position.
Figure 5B:
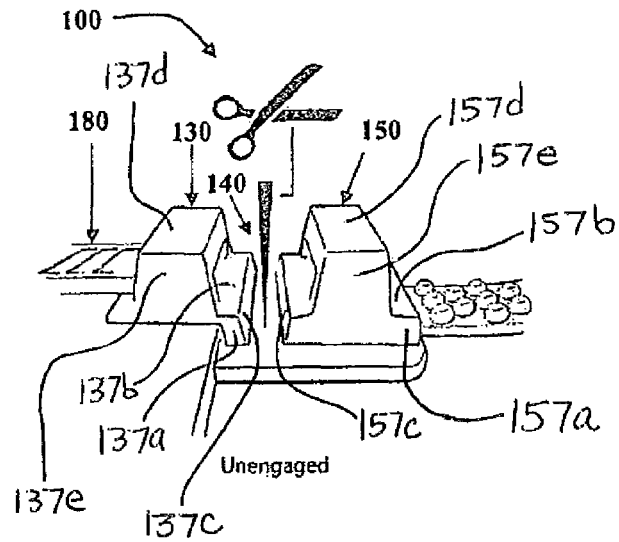
FIG. 5b is a left-hand perspective view illustrating a double bridged tag in which the tail has been cut after being engaged, thereby releasing the eyewear.

FIGS. 5a and 5b are left-hand perspective views illustrating a cutting channel arrangement according to an embodiment. Cutting channel 140 permits a purchaser to disengage the eyewear from the double bridged tag 100 after purchasing the eyewear. As illustrated in FIG. 5b, a cutting instrument, such as, without limitation, a pair of scissors may be inserted into cutting channel 140 to sever the portion of tail 180 located between ratchet channel 130 and guide channel 150. Cutting channel 140 can help eliminate the risk of damaging the eyewear during disengagement that is associated with hang tab designs in the prior art.

Figure 6:
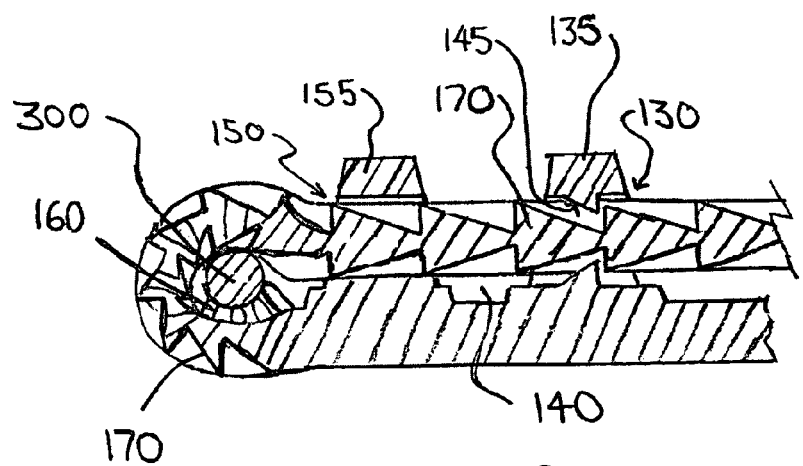
FIG. 6 is a fragmentary side elevation, in section, of the tag according to an embodiment of the invention, taken along line 6-6 of FIG. 4b.

Still referring to FIGS. 5a and 5b but additionally to FIG. 6, FIG. 6 is an enlarge fragmentary sectional of the structure of ratchet or locking channel 130 and guide channel 150, taken along line 6-6 of FIG. 4b. Guide channel 150 may be defined by guide arch 155, which may be molded as part of, or otherwise position on, tag body 190. The guide arch 155 upstands from a guide base 157a with the upstanding guide arch 155 to form the guide channel 150. The guide base 157a has a top surface 157b supported by sidewalls 157c extending down to the tag body 190. The guide arch 155 sits on the top surface 157b of the guide base 157a and includes a top or distal wall 157d supported by two sidewalls 157e extending up from the guide base 157a. Ratchet channel 130 may be defined by ratchet or locking arch 135, which may be molded as part of, or otherwise positioned on, tag body 190. The ratchet arch 135 upstands from a ratchet base 137a with the upstanding ratchet arch 135 to form the ratchet channel 130. The ratchet base 137a has a top surface 137b supported by sidewalls 137c extending down to the tag body 190. The ratchet arch 135 sits on the top surface 137b of the ratchet base 137a and includes a top or distal wall 137d supported by two sidewalls 137e extending up from the ratchet base 137a. By being set apart, the ratchet base 137a and the guide base 157a form a lower recessed portion of the cutting channel 140 therebetween and relatively below the channels 130, 150. Arch 135 may include, as part of the ratchet mechanism, pawl 145, which may be wedge-shaped, as illustrated, or which may have any other suitable shape (e.g., a rectangular cross-section) effective to serve as a ratchet mechanism in cooperation with teeth 170. Teeth 170 may be triangular ramp-like structures, as shown in FIG. 6, or other cross-sectional configurations may be employed.

As shown in FIG. 6, when tail 180 is wrapped around a portion of an article, such as bridge 300 of spectacles 310, knobs 160 will bear against a portion of the outer surface of bridge 300, and teeth 170 may deform.

Figure 7:
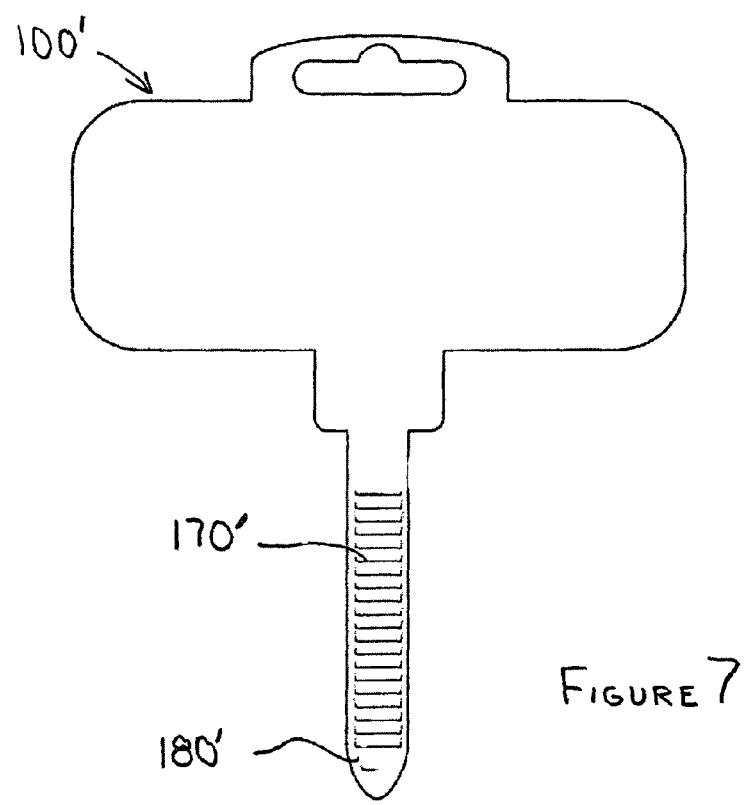
FIG. 7 is a front elevation of the tag according to an alternative embodiment of the invention.
Figure 8:
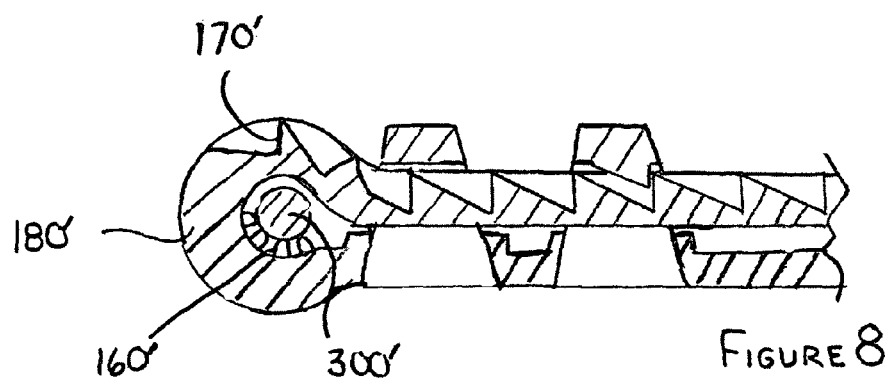
FIG. 8 is a fragmentary side elevation, in section, of a tag, according to the alternative embodiment of FIG. 7, wrapped around the bridge of a pair of spectacles.

In embodiments of the invention, teeth 170 are disposed on opposing sides of tail 180, and extend substantially along the: entire length of tail 180. In particular, in the embodiment of FIGS. 1-5b, teeth 170 disposed on the side of tail 180 which is facing away from the observer of FIG. 1, extend substantially from the free end of tail 180 all the way to a position opposite knobs 160, as reflected in FIG. 6. In some applications, however, e.g., when tag 100 is tasked to hold eyeglasses having narrow bridges, it may be desirable to provide more material for the thickness of tail 180 in the vicinity of knobs 160, for enhanced strength and resistance to cracking or splitting of the material. Accordingly, in alternative embodiments of the invention, such as that illustrated in FIG. 7, teeth 170' of tag 100' do not extend the entire length of tail 180', on the side of tail 180' which is opposite that from which knobs 160' emanate, but instead teeth 170' stop short of the position of knobs 160'. FIG. 8 illustrates, in a fragmentary side sectional elevation, a tag according to the embodiment of FIG. 7, with tail 180' wrapped around bridge 300', and knobs 160' gripping bridge 300'.

While detailed and specific embodiments of the double bridged tag have been described herein, it will be apparent to those skilled in the art that various changes and modifications can be made therein without departing from the spirit and scope of the double bridged tag. Thus, it is intended that the present disclosure cover these modifications and variations provided they come within the scope of any appended claims and/or their equivalents.

The invention claimed is:

1. A tag for displaying an article at a point of purchase, comprising:
a tag body;
an elongated article holding member, emanating from the tag body, and having a free end;
a guide member, fixed on the tag body, having a guide base with an upstanding guide arch forming a first channel, the guide member operably configured to insertably receive the free end of the elongated article holding member in the first channel;
a retaining member, fixed on the tag body, having a retaining base with an upstanding retaining arch forming a second channel, the retaining base being disposed in adjacent and spaced-apart relation to the guide member, the retaining member being operably configured to insertably receive the free end of the elongated article holding member in the second channel, subsequent to insertable receipt of the free end of the elongated article holding member through the guide member, the first and second channels being aligned so as to enable the simultaneous positioning of the free end of the elongated article holding member in both the first and second channels, wherein the guide base and the retaining base form a cutting channel recessed below the first and second channels;
the elongated article holding member and the retaining member having complementary engagement structures disposed thereon, for maintaining the elongated article holding member in an inserted position relative to the retaining member, upon insertable receipt of the free end of the elongated article holding member by the retaining member,
the elongated article holding member being configured to be wrapped around a portion of an article to be displayed, and subsequently and successively being inserted through the guide member and into the retaining member and retained there, so as to maintain said article in retaining relationship to the tag.

2. The tag according to claim 1, further comprising a hang tab, operably associated with the tag body, for enabling the tag to be suspended from a hanging device in a merchandise display.

3. The tag according to claim 1, further comprising a gap disposed between the retaining member and the guide member, for enabling a cutting device to be inserted therebetween for severing the elongated article holding member, to, in turn, enable an article being held by the elongated article holding member to be released.

4. The tag according to claim 1, wherein the elongated article holding member has a plurality of engagement surfaces disposed on at least one side thereof, and the retaining member has at least one engagement member, disposed within the second channel, such that upon insertion of the elongated article holding member in the retaining member, the fat least one engagement member is configured to engage successive ones of the plurality of engagement surfaces, as the elongated article holding member is inserted into the retaining member, the at least one engagement member preventing withdrawal of the elongated article holding member from the retaining member.

5. The tag according to claim 4, wherein the elongated holding member has engagement surfaces disposed on both sides thereof, and the retaining member has two engagement members, disposed within the second channel, for engagement the engagement surfaces on both sides of the elongated holding member.

6. The tag according to claim 5, wherein the elongated holding member has a plurality of flexible projections disposed on one side thereof, proximate the tag body, for contacting an article, when the elongated holding member is wrapped around an article to be displayed.

7. The tag according to claim 6, wherein the elongated holding member is devoid of engagement surfaces in a region -on the side of the elongated holding member opposite the plurality of flexible projections.

8. The tag according to claim 1, wherein the engagement surfaces comprise a plurality of successively arranged ramp-like structures disposed within the elongated holding member.

9. The tag according to claim 1, wherein the elongated holding member has a plurality of flexible projections disposed on one side thereof, proximate the tag body, for contacting an article, when the elongated holding member is wrapped around an article to be displayed.

10. The tag according to claim 1, further comprising a security measure on the tag body.

11. A tag for displaying an article at a point of purchase, comprising:
a tag body;
an elongated article holding member, emanating from the tag body, and having a free end;
a guide member, operably associated with the tag body, and operably configured to insertably receive the free end of the elongated article holding member, the guide member having a guide arch including a distal wall supported by sidewalls extending from a base to define a first channel extending therethrough;

a retaining member, operably associated with the tag body, and disposed in adjacent and spaced-apart relation to the guide member, the retainer member having a retaining arch including a distal wall supported by sidewalls extending from a base to define a second channel extending therethrough, the guide member being operably configured to insertably receive the free end of the elongated article holding member, subsequent to insertable receipt of the free end of the elongated article holding member by the guide member, the first and second channels being aligned so as to enable the simultaneous positioning of the free end of the elongated article holding member in both the first and second channels;

the elongated article holding member and the retainer member having complementary engagement structures disposed thereon, for maintaining the elongated article holding member in an inserted position relative to the retaining member, upon insertable receipt of the free end of the elongated article holding member by the retaining member, the elongated article holding member being configured to be wrapped around a portion of an article to be displayed, and subsequently and successively being inserted through the guide member and into the retaining member and retained there, so as to maintain said article in retaining relationship to the tag, and a gap disposed between the guide member and the retaining member, with a cutting channel recessed beneath the first and second channels as well as the elongated article holding member when the elongated article holding member is positioned in the first and second channels, respectively, of the guide member and the retaining member, for enabling a cutting device to be inserted therebetween for severing the elongated article holding member, to, in turn, enable an article being held by the elongated article holding member to be released.

12. A tag as recited in claim 11, further comprising a security measure on the tag body, the security measure being selected from the group consisting of an electronic article surveillance sensor, a RFID tag, and combinations thereof.

13. A tag for hanging eyewear while allowing a purchaser to wear the eyewear with minimal obstruction and to easily remove the tag with scissors, the tag comprising:
a body defining a slot for coupling to a display;
a tail depending from the body and having a plurality of teeth;
a first base being on the body and having a first top surface opposing the body and a first sidewall extending between the first top surface and the body;
a guide arch on the first top surface, the guide arch defining a guide channel for receiving the tail without engaging the teeth;
a second base being on the body and having a second top surface opposing the body and a second sidewall extending between the second top surface and the body; and
a locking arch on the second top surface, the locking arch defining a ratchet channel and having a pawl in the ratchet channel for ratchet engagement with the teeth and, in turn, forming a loop around the eyewear, the locking arch resting on a second base,
wherein the first and second base are set apart to define a cutting channel below the top surfaces and between the first and second sidewalls for the scissors.

14. A tag as recited in claim 13, wherein a portion of the loop has at least one knob for engaging the eyewear.

15. A tag as recited in claim 14, wherein the at least one knob is fabricated from silicone.

16. A tag as recited in claim 13, wherein the eyewear is affixed to the tag to present the eyewear in a substantially horizontal orientation.

* * * * *